Patented Nov. 25, 1952

2,619,485

UNITED STATES PATENT OFFICE 2,619,485

MORPHINE DERIVATIVES AND PRODUCTION THEREOF

Pierre Chabrier, Paris, Pierre R. L. Giudicelli, Fontenay-sous-Bois, and Charles H. Génot, Paris, France, assignors to Les Laboratoires Dausse, Societe Anonyme, Paris, France, a company of France No Drawing. Application August 11, 1950, Serial No. 178,996. In France August 30, 1949

2 Claims. (Cl. 260—247.5)

As apparent from the following formula

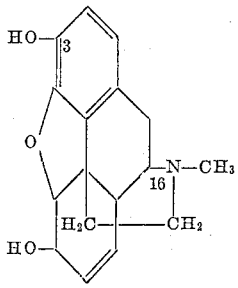

(1)

morphine has a phenol group in 3-position and is capable upon alkylation thereof, to yield ethers of which codeine (Fomula 2)

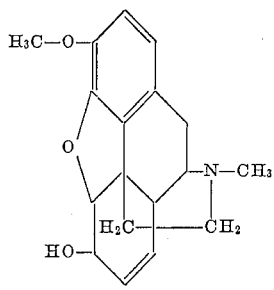

(2)

is one of the best known.

If morphine is alkylated directly by means of simple alkyl halides such as methyl iodide, the yields are poor chiefly by reason of the tertiary nitrogen atom in 16-position which separately fixes simple alkyl halides to produce corresponding quaternary ammonium compounds (Formula 3 in which R stands for an alkyl group and X for a halogen atom):

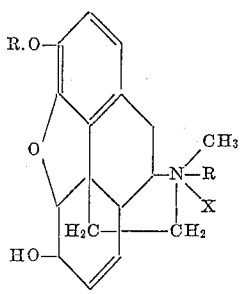

(3)

Consequently trimethyl aniline hydroxide

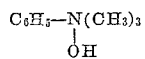

has been preferred for producing codeine.

It is a primary object of our invention to provide a new class of morphine ethers and derivatives thereof having valuable properties as will hereinafter be stated. Further objects will become apparent as the specification proceeds.

According to this invention, we provide new morphine ethers of the following Formula 4

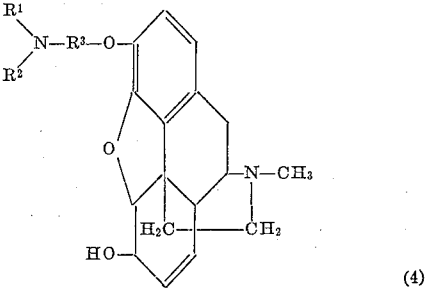

(4)

wherein $R^1$ and $R^2$ stand for organic groups which may be interconnected to form a heterocycle with N, $R^3$ stands for an acyclic hydrocarbon divalent radicle having a straight or branched carbon chain, preferably of the type $—(CH_2)_n—$, $n$ being an integer from 1 upwards.

Still in accordance with this invention, we provide a process for the production of morphine ethers of the Formula 4, wherein a halide $R^1(R^2)—N—R^3—X$ is caused directly to react with morphine, $R^1$, $R^2$, $R^3$ having the same significance as above, while X denotes a halogen atom.

Although $R^1$, $R^2$, $R^3$ are restricted simply to the limitation imposed by the above definition thereof, we prefer in commercial practice, for economic reasons which will be obvious to those skilled in the art, to fix on morphine groups $R^1(R^2)—N—R^3—$ derived from compounds which are readily available in industry; β-tertiary-amino ethyl groups are accordingly given preference; typical groups in that respect are β-dimethylamino ethyl,
β-diethylamino ethyl,
β-morpholinyl ethyl,
β-piperidyl ethyl.

However it should be understood that this invention is not restricted to the foregoing, preferred examples.

Alternatively instead of starting from a halide $R^1(R^2)—N—R^3—X$, particularly from a chloride, we may also employ a hydrohalide of said halide such as $R^1(R^2)—N—R^3—X$, for example a hydrochloride, as a reactant. In both cases, i. e. whether the reactant is a halide or a hydrohalide thereof, we effect the reaction in an alkaline solution, the amount of alkali in the solution being calculated for exactly neutralizing the hydrogen halide which is present and/or produced through the reaction.

We found it desirable to effect the reaction either in a vacuo or in the presence of an inert gas with a view to precluding conversion of morphine to oxydimorphine through oxidation of morphine in alkaline solution by atmospheric oxygen. When working in those conditions, alkylation takes place with good yields of the order of 80–85 per cent.

The morphine ethers according to this invention which derive from tertiary amino lower alkanes are substances having a syrupy or waxy consistence and crystalizing with difficulty. They are little coloured if they were produced with exclusion of air, and have a brown red colour if they were produced in the presence of oxygen. They are very readily soluble in water and soluble in hot acetone, as distinguished from morphine which is very sparingly soluble in said solvents. Furthermore, the new ethers yield aqueous solutions of definitely basic character which however cannot be titrated with accuracy in the presence of coloured indicators.

Owing to their being very readily soluble in water and having a more basic character with morphine, the new ethers according to this invention enabled us to produce numerous water-soluble salts from various acids. In particular, it is thus possible to solubilize sparingly soluble acids with a view to administering the same for therapeutic purposes, into combinations with the new ethers, and thereby to impart to them supplemental activities or synergetic activities which are very desirable from a medical standpoint.

Consequently, according to this invention, we also provide new salts which may be produced from the direct reaction of acids with the above morphine ethers, in aqueous solution and in calculated proportions. For isolating said salts, the aqueous solutions thus produced may be evaporated or atomized. Alternatively, the new salts may be produced through double decomposition in alcoholic medium, from a hydrohalide of the morphine ether and an alcohol soluble salt of the acid.

The new morphine ethers and salts thereof were found to produce an inhibiting effect on the bulb breathing centre and the cough centre; accordingly they are useful as medicines for dyspnoeas, particularly against coughing. With some salts, particularly phenylacetates, the therapeutic potency is increased. The new compounds have a low toxicity, in fact with many of them a lower toxicity than codeine for an at least equal potency; in that respect, the $\beta$-morpholinyl ethyl ether is three times less toxic than codeine.

The following examples which are not limiting will illustrate this invention and the manner of carrying the same into effect; except where otherwise indicated, the parts referred to are parts by weight.

EXAMPLE 1

*Morphine $\beta$-dimethylamino ethyl ether*

6 parts of morphine were dissolved in a solution of 1.6 parts of sodium hydroxide in 20 parts of water, by dropping the sodium hydroxide solution on morphine in a vessel which was evacuated or, in another experiment, filled with an inert gas. After morphine was dissolved, 4 parts of hydrochloride of $\beta$-dimethylamino ethyl chloride dissolved in 10 parts of water were added to the morphine solution. The resulting solution was heated on a water-bath for 2½–3 hours with exclusion of atmospheric air. The solution was then evaporated to dryness in a vacuo, the residue was washed with pure ether then taken up in acetone which dissolved only the desired compound. Upon evaporation of acetone we obtained $\beta$-dimethylamino ethyl ether of morphine as a waxy mass, very readily soluble in water and having a light yellow color (with the reaction was effected away from oxygen).

The yield amounted to 70–80 per cent.

EXAMPLE 2

*Morphine $\beta$-diethylamino ethyl ether*

The procedure was the same as in Example 1, with 4.25 parts of hydrochloride of $\beta$-diethylamino ethyl chloride instead of 4 parts of hydrochloride of $\beta$-dimethylamino ethyl chloride. The yield amounted to 65–70%. The pure compound had a melting point of 70° C.

EXAMPLE 3

*Morphine $\beta$-morpholinyl ethyl ether*

5 parts of morphine thinned with 10 parts of water were reacted with 4.2 parts of hydrochloride of $\beta$-morpholinyl ethyl chloride dissolved in 20 parts of water, in the presence of 17 parts (by volume) of a 2N sodium hydroxide solution, the reaction being effected in an evacuated vessel.

The reactant mixture was heated in a vacuo for an hour on a boiling water-bath. After cooling, unreacted morphine was precipitated with a stream of carbon dioxide.

Morphine was filtered off, the aqueous solution was evaporated to dryness, and $\beta$-morpholinyl ethyl ether of morphine was extracted by means of acetone or alcohol to be separated from the accompanying inorganic salts.

The yield amounted to 60–70%. The pure compound had a melting point of 90° C.

EXAMPLE 4

*$\beta$-morpholinyl ethyl morphine ether salts*

To a solution of 12 parts of $\beta$-morpholinyl ethyl ether of morphine in 60 parts of absolute alcohol, a solution of 5 parts of crystallized phosphoric acid in 20 parts of absolute alcohol was added. A white, curdy precipitate was thus produced; it was isolated and found to contain one mol of $\beta$-morpholinyl ethyl ether per two mols of phosphoric acid.

By adding phenylacetic and to an aqueous or alcoholic solution of $\beta$-morpholinyl ethyl ether of morphine in equimolar proportion with respect to the base and evaporating the solvent, the phenylacetic salt of said base was obtained.

We prepared the hydrochloride by the same procedure.

EXAMPLE 5

*$\beta$-piperidyl ethyl ether of morphine*

The procedure was exactly the same as in Example 3, hydrochloride of $\beta$-piperidyl ethyl chloride being employed instead of hydrochloride of $\beta$-morpholinyl ethyl chloride, in substantially the same proportion.

$\beta$-piperidyl ethyl ether of morphine was thus obtained, with a slightly lower yield; in pure condition it had a melting point of 70° C.

By the same procedure as set forth in Example 4, corresponding salts of the last-named base were obtained.

The phenylacetate is of particular interest, in the sense that it is better than the hydrochloride in view of its antispasmodic action on unstriped fibres; this is a valuable action particularly at the level of bronchial muscles for the treatment of spasmodic coughing, and at the level of intestine because unlike codeine, the phenylacetate does not produce contracture effects. The foregoing desirable results are likewise obtained with the phenylacetic salts of all other tertiary amino alkyl ethers according to this invention.

As to the phosphates they were found to be fixed more rapidly than the parent bases on the nervous centres on which the bases are capable of acting.

According to this invention we further provide diquaternary ammonium derivatives of the tertiary amino ethers of the Formula 4, particularly the di-iodomethylates and dibromomethylates of said ethers. They may be produced for example by adding a slight excess of methyl iodide or bromide to an alcoholic solution of the ether; a precipitate of di-iodomethylate or dibromomethylate is produced and separated.

The quaternary ammonium derivatives of the tertiary amino ethers (Formula 4) were found desirable in therapeutics by reason of their strong curarizing properties.

The following examples are illustrative.

EXAMPLE 6

*Dibromomethylate of β-morpholinyl-ethyl ether of morphine*

To a chloroform solution of β-morpholinyl-ethyl ether of morphine (1 mol) methyl bromide (3 mols) were added. The dibromomethylate of said ether gradually precipitated and was filtered off. It had a melting point of 290° C., was soluble in water but little soluble in organic solvents.

The di-iodomethylate prepared from methyl iodide according to the same procedure had a melting point of 240° C.

EXAMPLE 7

*Dibromomethylate of β-diethylamino ethyl ether of morphine*

A slight excess of methyl bromide was added to an alcoholic solution of β-diethylamino ethyl ether of morphine. The dibromomethylate was precipitated and filtered off. It had a melting point of 262–265° C., was soluble in water but little soluble in organic solvents.

We have further found that it is possible to obtain another class of di-quaternary ammonium derivatives also exhibiting strong curarizing properties.

The last-named derivatives are related to tertiary-amino-alkyl ethers of 7.8-dihydro-morphine (Formula 5)

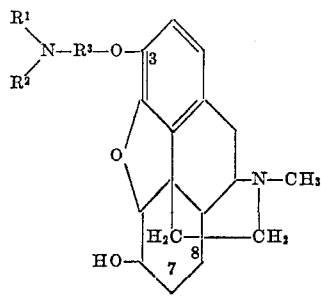

(5)

According to this invention, we provide new ethers of 7.8-dihydro-morphine of the Formula 5 in which $R^1$, $R^2$, $R^3$ have the same meaning as above, and also new di-quaternary derivatives (Formula 6 below) of said ethers

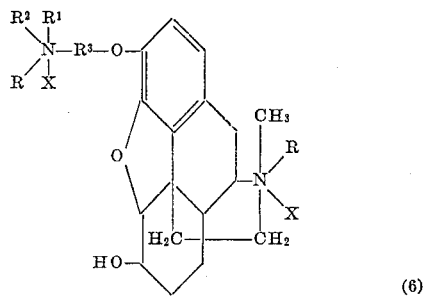

(6)

wherein $R^1$, $R^2$, $R^3$ have the same meaning as in Formula 4, R denotes an alkyl group and X a halogen atom.

For producing the dihydro-morphine ethers of Formula 5, morphine ethers of Formula 4 may be subjected to catalytic hydrogenation; the diquaternary ammonium derivatives of the Formula 6 may be readily produced by reacting alkyl halides RX with dihydro-morphine ethers of the Formula 5.

The following examples are illustrative.

EXAMPLE 8

*(a) β-morpholinyl ethyl ether of dihydromorphine*

β-morpholinyl ethyl ether of morphine was hydrogenated at atmospheric pressure in the presence of Raney catalyst in alcoholic solution. Hydrogenation proceeded fairly rapidly. The catalyst was filtered off, alcohol was evaporated in a vacuo and the residue crystallized.

The β-morpholinyl ethyl ether of dihydro-morphine had a melting point of 48° C., was very readily soluble in water and in alcohol but little soluble in ether and benzene.

*(b) Dibromomethylate of β-morpholinyl ethyl ether of dihydromorphine*

To a chloroform solution of β-morpholinyl ethyl ether of dihydromorphine (1 mol), methyl bromide was added. The dibromomethylate precipitated gradually. It had a melting point of 302° C. and was very readily soluble in water.

EXAMPLE 9

*(a) β-diethylamino ethyl ether of dihydromorphine*

The procedure was the same as in Example 8 (a), the starting material being β-diethylamino ethyl ether of morphine. The β-diethylamino ethyl ether of dihydro-morphine thus produced had a melting point of 46° C. and was soluble in water and in alcohol, and fairly soluble in ether.

What we claim is:

1. A process for the production of a new morphine ether which comprises the step of reacting morphine with a hydrohalide of a tertiary-amino-lower-alkyl halide, the tertiary amino group of which is selected from the group consisting of dimethylamino, diethylamino, morpholinyl and piperidyl groups, in water containing the calculated amount of alkali for neutralizing the hydrogen halides released by the reaction.

2. 3-(β-morpholinyl-ethyl)-ether of morphine.

PIERRE CHABRIER.
PIERRE R. L. GIUDICELLI.
CHARLES H. GÉNOT.

No references cited.